United States Patent
Horii et al.

(10) Patent No.: US 6,290,015 B1
(45) Date of Patent: Sep. 18, 2001

(54) ATTACHING STRUCTURE OF REAR CUSHION BRACKET

(75) Inventors: Yoshiyuki Horii; Toshio Matsuno, both of Saitama (JP)

(73) Assignee: Honda, Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,820

(22) Filed: Sep. 10, 1999

(30) Foreign Application Priority Data

Sep. 11, 1998 (JP) ................................. 10-276574

(51) Int. Cl.$^7$ ................................. B62D 61/02
(52) U.S. Cl. ................. 180/219; 280/274; 280/281.1; 280/781
(58) Field of Search ............... 180/219; 280/781, 280/785, 797, 798, 781.1, 284, 274

(56) References Cited

U.S. PATENT DOCUMENTS

| | | | | |
|---|---|---|---|---|
| 4,735,355 | * | 4/1988 | Browning | 228/189 |
| 5,423,564 | * | 6/1995 | Harvey | 280/281.1 |
| 5,557,961 | * | 9/1996 | Ni et al. | 72/61 |
| 5,826,899 | * | 10/1998 | Klein et al. | 280/284 |
| 5,897,139 | * | 4/1999 | Aloe et al. | 280/788 |
| 5,915,727 | * | 6/1999 | Bonnville | 280/788 |
| 6,050,474 | * | 4/2000 | Aota et al. | 228/112.1 |
| 6,058,865 | * | 5/2000 | Thibeault | 114/79 |

FOREIGN PATENT DOCUMENTS

A10-71981  3/1998 (JP).

* cited by examiner

*Primary Examiner*—Daniel G. DePumpo
(74) *Attorney, Agent, or Firm*—Birch, Stewart, Kolasch & Birch, LLP

(57) ABSTRACT

To make a vehicle body frame welded with a rear cushion bracket as thin as possible and as light as possible. A vehicle body frame includes a bracket attached to a rear face of an upper portion of a center pipe. The bracket is attached with a rear wheel suspension and a cushion unit is supported thereon at an upper end portion thereof. The wall of the center pipe includes thick wall portions provided only at corner portions of left and right sides of a rear face wall thereof. Left and right end portions of a base portion of the bracket are welded at outer sides thereof to the thick portions of the center pipe. The wall thickness T1 and T3 of thick wall portions of the center pipe are made substantially equal to the wall thickness T2 and T4 of left and right end portions of the base portion of the bracket to be welded. Furthermore, the wall thickness of other portions of the center pipe is made thinner. The center pipe is formed by extrusion of an aluminum alloy or the like.

11 Claims, 5 Drawing Sheets

ATTACHING STRUCTURE OF REAR CUSHION BRACKET

BACKGROUND OF THE INVENTION

1. Field of the Invention

The present invention relates to an attaching structure for a rear cushion bracket in a motorcycle.

2. Description of Related Art

It is known to attach a rear cushion bracket to a rear portion of a hollow vehicle body frame by welding (as an example, refer to JP-A-10-71981).

In general, a known rear cushion bracket has a wall thickness thicker than a wall thickness of the vehicle body frame. When the rear cushion bracket is directly welded to the vehicle body frame, stresses are caused on the side of the vehicle frame due to a difference in the wall thickness. Therefore, deformation of the vehicle body frame and/or the cushion bracket occurs. In order to avoid this phenomenon, as in the conventional example, the cushion bracket is welded to a patch plate having a wall thickness substantially equal to that of the vehicle body frame and thereafter, the patch plate is welded to the vehicle body frame.

However, in such a case, the number of parts and the number of steps of welding are increased. Accordingly, if possible, it is desired to dispense with such a patch plate.

Furthermore, although it is conceivable to thicken the wall thickness of the vehicle body frame to a degree the same as that of the cushion bracket, it is not advisable since in such a case, the total weight of the vehicle body is increased.

SUMMARY OF THE INVENTION

In order to resolve the above-described problem, according to the present invention, there is provided an attaching structure for a rear cushion bracket wherein a motorcycle has a rear cushion bracket attached to a rear portion of a hollow vehicle body frame by welding. A wall thickness of the rear cushion bracket and a wall thickness of the vehicle body frame on a counterpart side are partially and respectively adjusted such that a wall thickness of a weld portion of the rear cushion bracket and a wall thickness of a weld portion of the vehicle body frame are substantially equal to each other.

According to the present invention, the wall thickness of the vehicle body frame and the cushion bracket are partially and respectively adjusted such that the wall thickness of the respective weld portions thereof becomes substantially equal to each other. Accordingly, deformation on the side of the vehicle body frame can be avoided even when the cushion bracket is welded to the vehicle body frame. Furthermore, only a portion of the vehicle body frame to be welded with the rear cushion bracket is thickened. Other portions of the vehicle body frame can be thinned more than the weld portion.

In view of this, the total weight of the motorcycle can be made as light as possible, and the need for a patch plate can be dispensed with. Therefore, the number of parts and the number of steps of welding can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An explanation will now be given of an embodiment with reference to the accompanying drawings as follows.

Figure 2:
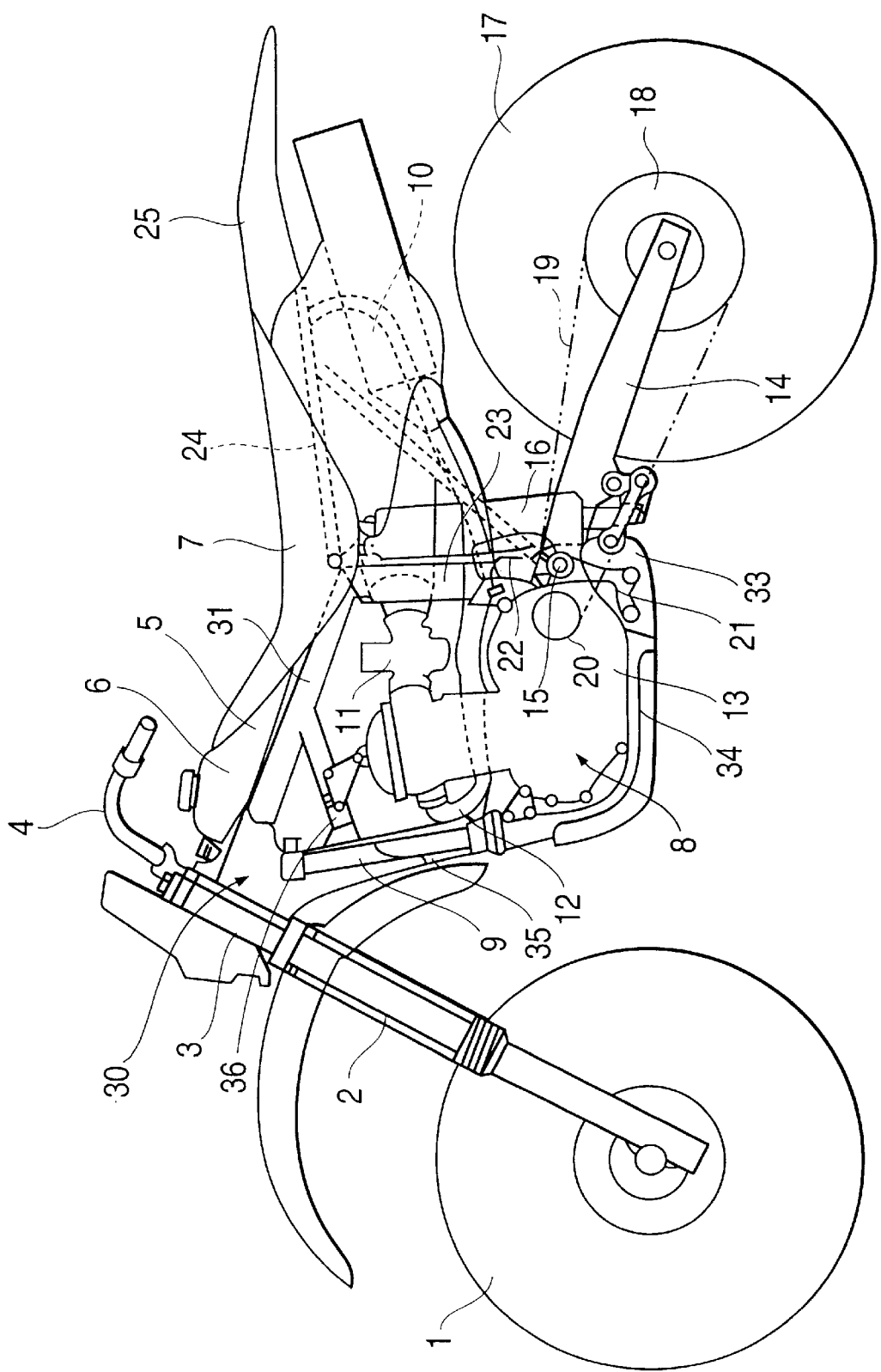
FIG. 2 is a side view of a motorcycle to which the embodiment of the present invention is applied.

First, an explanation will be given of an outline structure of a motorcycle with reference to FIG. 2. An upper portion of a front fork 2 supporting a front wheel 1 is attached to a head pipe 3 and is pivotably supported by a front end portion of a vehicle body frame 5 by a handle 4.

The vehicle body frame 5 is a cradle-type which supports a head portion 6 integrally formed with a head pipe 3 and an engine 8 on a lower side of a seat 7 along the center of the vehicle body therefrom. The engine 8 is a water-cooled type, and is cooled by a radiator 9. The engine 8 also intakes air from an air clearer 10 arranged on the lower side of the seat 7 via a carburetor 11 and exhausts gas from an exhaust port via an exhaust pipe 12.

At a portion of the vehicle body frame 5 on the rear side of a crank case 13 of the engine 8, front end portions of rear swing arms 14 are swingably supported by a pivot shaft 15 in the up and down direction. A rear cushion unit 16 is installed between the rear swing arms 14 and the vehicle body frame 5.

A rear wheel 17 is supported by rear end portions of the rear swing arms 14 and is driven by a drive side sprocket 20 of the crank case 13 via a chain 19 along with a driven side sprocket 18 coaxially installed therewith.

Reference numeral 21 designates a step bracket, 22 designates a chain protector, 23 designates a rear stay, 24 designates a seat rail, and 25 designates a rear fender.

Figure 3:
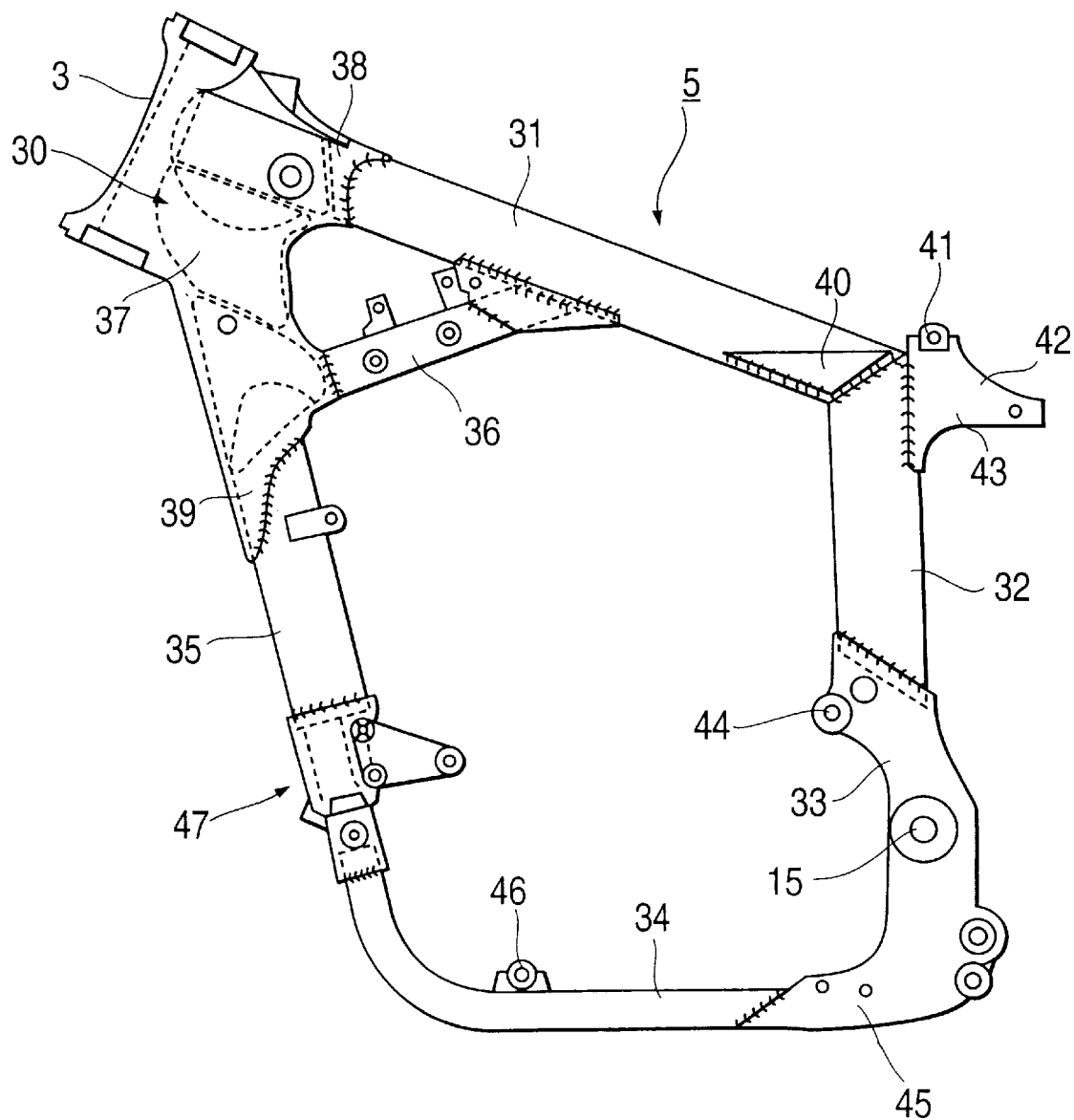
FIG. 3 is a view showing a vehicle body frame thereof.
Figure 4:
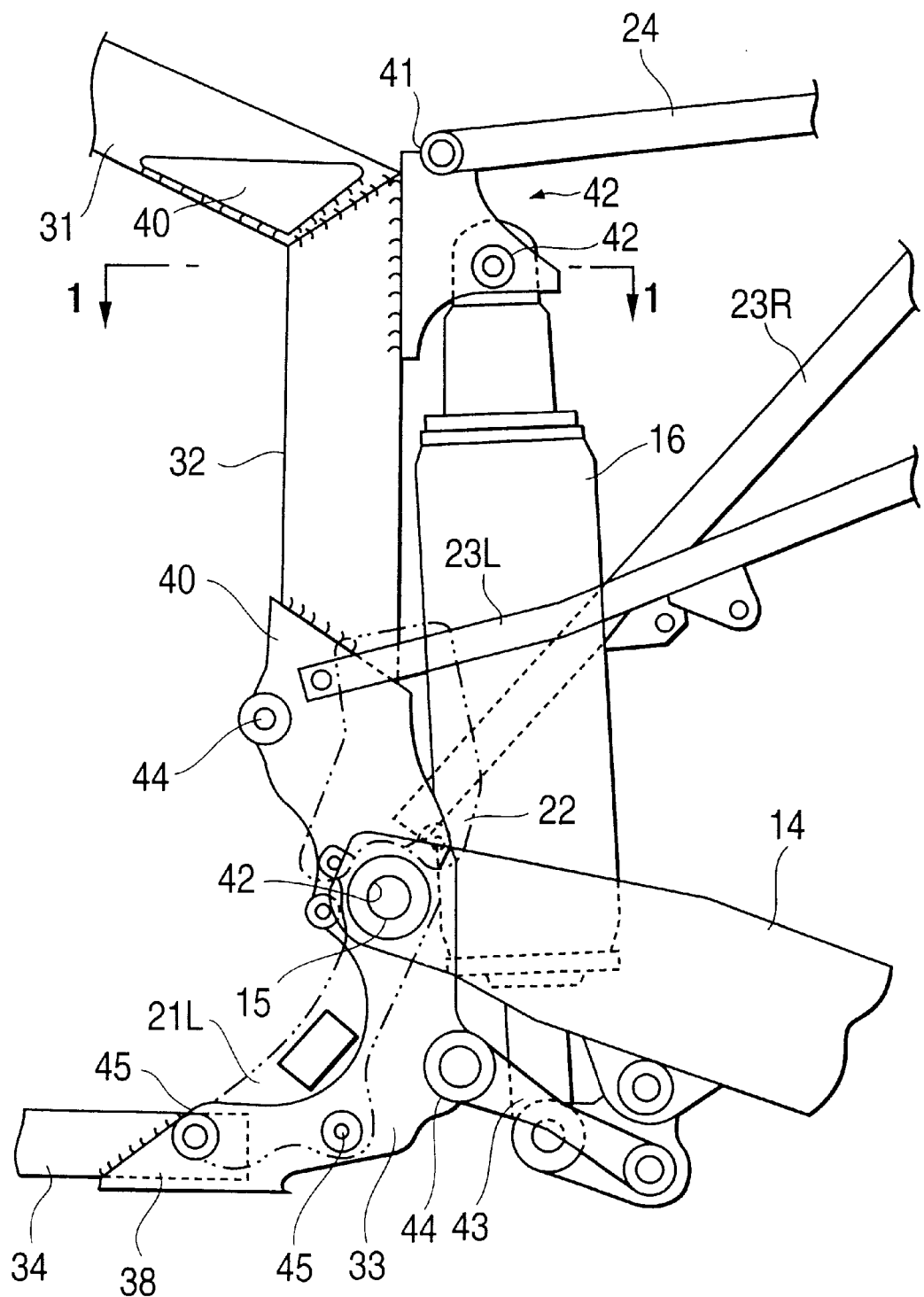
FIG. 4 is a side view of essential portions of a center frame.

FIG. 3 illustrates details of a front half portion of the vehicle body frame 5 except the rear stays 23 and the seat rails 24. The vehicle body frame 5 is formed in the shape of a loop in side view by a head pipe 30, a main pipe 31, a center pipe 32, a pivot frame 33, lower pipes 34, a down pipe 35 and a reinforcement pipe 36. The main pipe 31, the center pipe 32, the pivot frame 33 and the down pipe 35 are respectively arranged along the center of the vehicle body thus constituting a backbone type frame.

Furthermore, left and right pairs of the lower pipes 34 are installed, as well as the rear stays 23 and the seat rails 24, illustration of which is omitted in the drawing.

The head pipe 30 is a hollow member cast by using a pertinent metal material of an aluminum alloy or the like by integrating the head pipe 3 and a main pipe side joint portion 37 which is a portion connected to the main pipe 31, and a down pipe side joint portion 38 which is a portion connected to the down pipe 35. Details of the above will be described below.

The main pipe 31 is square in cross-section and has a straight shape. The main pipe 31 is made of a pertinent metal material of an aluminum alloy or the like, which is fitted to a cylindrical portion of the joint portion 37, a front end portion of which is formed having a square cross-section generally the same as the main pipe 31, and bonded thereto by welding.

A rear end portion of the main pipe 31 is cut obliquely and is brought into contact with and welded to an upper end portion of the center pipe 32 which is similarly cut obliquely. The side faces of the bonded portion of the main pipe 31 are reinforced by gussets 40.

The center pipe 32 is a square pipe member having a straight shape and made of a pertinent metal material of an aluminum alloy or the like having a section similar to that of the main pipe 31. The center pipe 32 is welded with a bracket 43 having an attachment portion 41 to be attached with the seat rails 24 and an attachment portion 42 to be attached with the rear cushion unit 16 on a rear face side thereof adjacent to the portion bonded with the main pipe 31.

The center pipe 32 extends downwardly on the rear side of the engine 8 and a lower end portion thereof which is cut obliquely is fitted and welded to an upper end portion of the pivot frame 33 which is formed similarly.

The pivot frame 33 is fabricated by casting an aluminum alloy and includes a substantially channel-like shape which is opened to the front side.

An upper portion of the pivot frame 33 is installed with an engine hanger attaching portion 44 and an intermediate portion thereof is installed with a pivot coupling portion 15. A lower end portion thereof is installed with lower pipe joint portions 45, to which respective rear end portions of the lower pipes 34 are fitted and welded.

The lower pipes 34 are arranged in the forward and rearward direction on the lower side of the engine 8. An intermediate portion of the lower pipes 34 are installed with an engine hanger 46. Front end portions thereof are bent upwardly and are connected to a joint piece 47.

The joint piece 47 is also made of an aluminum alloy or the like. A lower portion thereof is forked and connected to respective front end portions of the left and right lower pipes 34. An upper portion thereof constitutes a single cylindrical portion and is welded to a lower end portion of the down pipe 35. The joint piece 47 supports the oil tank along with the down pipe 35 and the head pipe 30.

Figure 5:
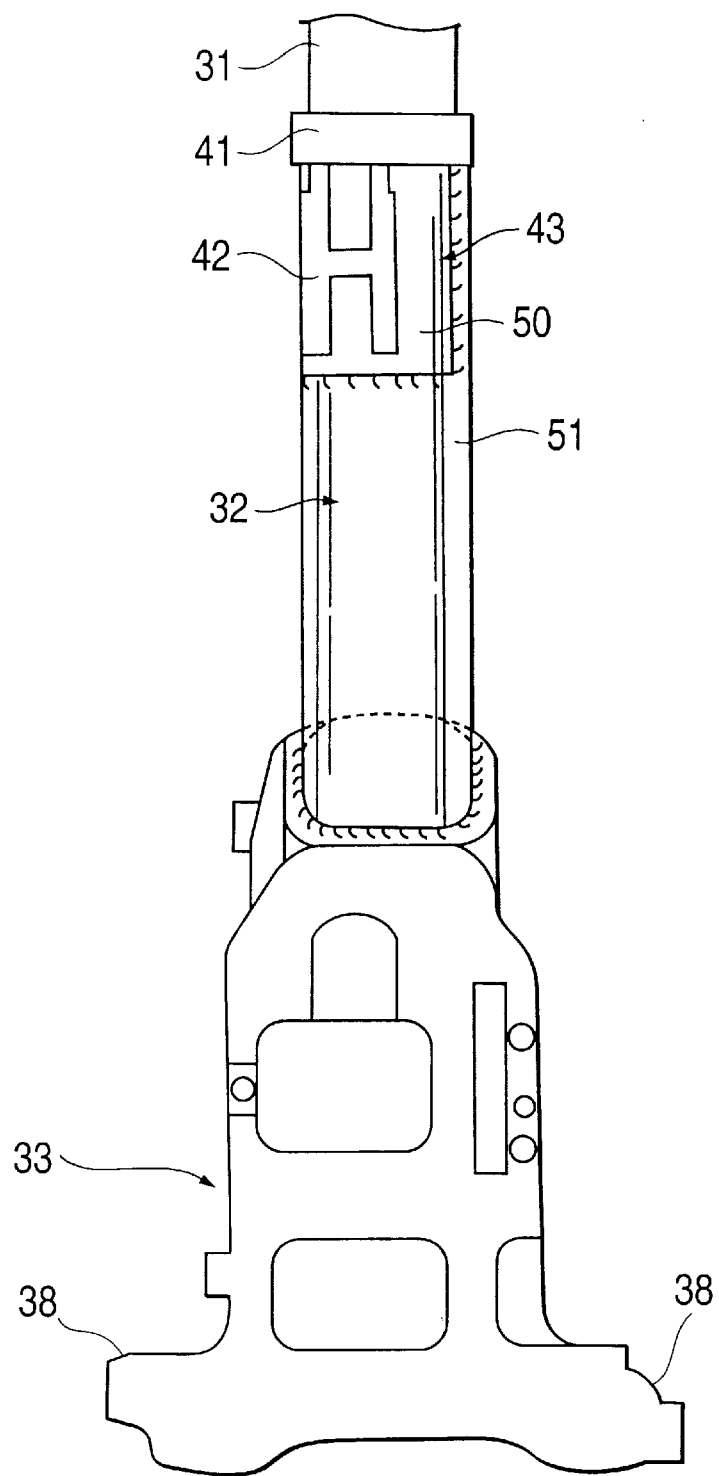
FIG. 5 is a rear view of the center frame.

An explanation will now be given of an attaching structure for the cushion bracket as follows. As shown by FIG. 5, the bracket 43 is provided with a base portion 50 having a width substantially equal to a width of a rear face of the center pipe 32. The attachment portion 42 is shifted to one side in the left and right direction relative to the base portion 50.

Figure 1:
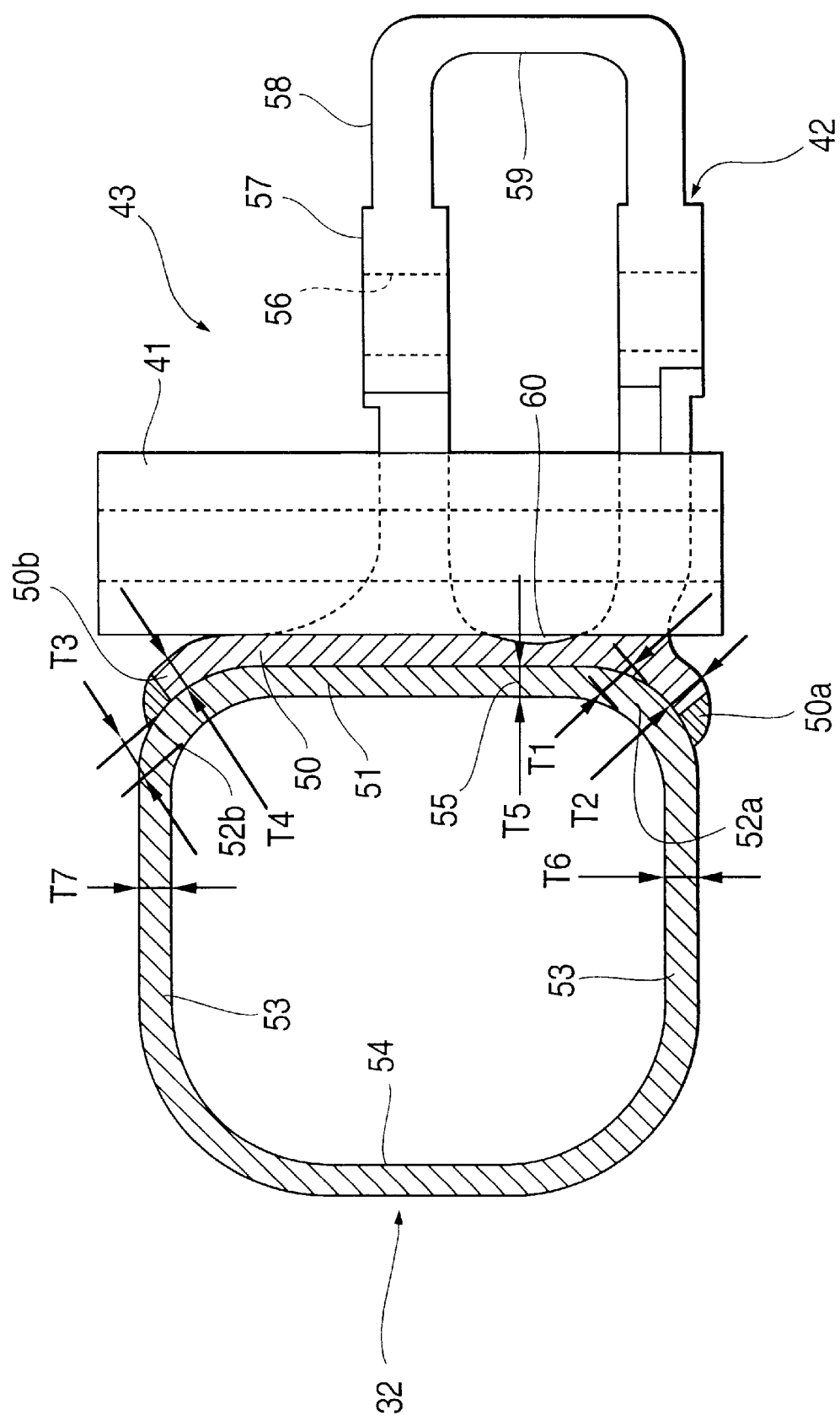
FIG. 1 is a sectional view along a line 1—1 of FIG. 4 of a weld portion for a rear cushion bracket according to an embodiment.

As is apparent from FIG. 1, the base portion 50 overlaps a rear face wall 51 of the center pipe 32 and both end portions in the left and right direction thereof turn around to side directions along rounded portions at both ends in the left and right direction of the rear face wall 51 and are welded thereto.

Referring to FIG. 1, the center pipe 32 is of substantially rectangular or square shape having rounded corners. The center pipe 32 includes thick wall portions 52a and 52b at weld portions T1 and T3 only. The wall thickness of other portions of the side wall 53 and front wall 54 are thinner than the thick wall portions 52a and 52b. Furthermore, a large portion of the rear face wall 51 is similarly thinned.

The wall thickness of the center pipe 32 can freely be changed by extrusion of an aluminum alloy or the like. That is, the wall thickness T1 and T3 of the weld portions are respectively and substantially equal to each other and the wall thickness T2 and T4 of end portions 50a and 50b in the left and right direction of the base portion 50 are substantially equal to each other. Furthermore, the wall thickness T6 end T7 of left and right side walls are respectively thinner than the wall thickness T1 and T3 of the thick wall portion 52a and the thick wall portion 52b.

Furthermore, a wall thickness of the rear face wall 51 opposed to the base portion 50 is gradually thinned toward the thick wall portion 52a on one side. A portion thereof overlapping the position of the attachment portion 42 constitutes the thinnest wall portion 55, and a wall thickness T5 thereof is thinner than any other wall thickness T1 through T7. Furthermore, a portion of the base portion 50 overlapping the rear face wall 51 in correspondence with the thinnest wall portion 55, is formed with a thin wall portion 60 produced by reduction of the wall thickness compared to other portions of the base portion 50.

Furthermore, the attachment portion 42 substantially constitutes a loop shape and includes boss portions 57 formed with attaching holes 56 of the rear cushion unit 16 which are thick. Other portions of the attachment portion 42 are thin, with a bridge portion 59 at a rear end portion being the thinnest. In this way, when the rear cushion unit 16 is fastened by bolts and nuts, the attachment portion 42 can be deformed to some degree.

Furthermore, although the center pipe 32 attached with the rear cushion bracket 43 is thicker than the main pipe 31 to provide high strength, the length is made as short as possible such that an increase in weight does not result.

An explanation will now be given of the operation of the present embodiment. As is apparent from FIG. 1, the thick wall portions 52a and 52b are provided at left and right end portions of the rear face wall 51. The base portion 50 of the bracket 43 is welded at outer side ends thereof. Accordingly, even when portions other than the thick wall portions 52 of the center pipe 32 are made as thin as possible, the center pipe 32 withstands heat during welding and can be prevented from being deformed.

Furthermore, the wall thickness of the other portions of the center pipe 32 are thinner and therefore, an increase in total weight can be prevented. Particularly, by thinning the portion of the rear face wall 51 overlapping the attachment portion 42, the total weight can be further reduced.

In addition, the above structure is preferable in the case where a vehicle body frame is of backbone type and includes pipe members made of an extruded material. Furthermore, the present invention is not limited to the above embodiment, but can be modified in many ways. In particular, the rear cushion bracket 43 can also be attached to the side of the main pipe 31.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An attaching structure of a rear cushion bracket for a motorcycle comprising:

a hollow center pipe having a rear wall, a front wall and side walls forming a generally square shaped cross-section with rounded corners, said rear wall, front wall and side walls having a wall thickness, said hollow center pipe including a weld portion having a wall thickness on at least two of said rounded corners, wherein said wall thickness of said weld portion is thicker than said wall thickness of the rear, front and side walls;

a rear cushion bracket having a wall thickness, said rear cushion bracket attached to said rear wall of said hollow center pipe by welding, said rear cushion bracket including a base portion and an attachment portion, said base portion including a weld portion having a wall thickness, wherein said wall thickness of said weld portion of said base portion and said weld portion of said hollow center pipe are substantially equal to each other;

said rear wall of said hollow center pipe is located between at least said two rounded corners, whereby said wall thickness of said rear wall is the thinnest wall of said hollow center pipe; and wherein said rear wall is arranged in face-to-face contact with said base portion of said rear cushion bracket, wherein a wall thickness of said base portion is thinner than a wall thickness of said attachment portion.

2. The attaching structure of a rear cushion bracket according to claim 1, wherein said rear cushion bracket includes:

a first attachment portion connected to said base portion, said first attachment portion is of substantially loop shape in cross-section and includes wall portions having boss portions formed therein, said boss portions are thicker than the wall portions and include holes formed therethrough for attaching cushion units of the motorcycle thereto.

3. The attaching structure of a rear cushion bracket according to claim 2, wherein a wall portion of said first attachment portion furthest away from said base portion is the thinnest wall portion of said first attachment portion.

4. The attaching structure of a rear cushion bracket according to claim 2, wherein said rear cushion bracket further comprises a second attachment portion attached to said base portion for attaching seat rails of the motorcycle thereto.

5. The attaching structure of a rear cushion bracket according to claim 4, wherein said first attachment portion is attached to said base portion at a position offset to one side of said base portion.

6. A motorcycle, comprising:

a motorcycle body frame;

a hollow center pipe having a rear wall, a front wall and side walls forming a generally square shaped cross-section with rounded corners, said rear wall, front wall and side walls having a wall thickness, said hollow center pipe including a weld portion having a wall thickness on at least two of said rounded corners, wherein said wall thickness of said weld portion is thicker than said wall thickness of the rear, front and side walls;

a rear cushion bracket having a wall thickness, said rear cushion bracket attached to said rear wall of said hollow center pipe by welding, said rear cushion bracket including a base portion and an attachment portion, said base portion including a weld portion having a wall thickness, wherein said wall thickness of said weld portion of said base portion and said weld portion of said hollow center pipe are substantially equal to each other;

said rear wall of said hollow center pipe is located between at least said two rounded corners, whereby said wall thickness of said rear wall is the thinnest wall of said hollow center pipe; and wherein said rear wall is arranged in face-to-face contact with said base portion of said rear cushion bracket, wherein a wall thickness of said base portion is thinner than a wall thickness of said attachment portion.

7. The motorcycle according to claim 6, said motorcycle further comprising cushion units and a rear wheel supported by said cushion units, said rear cushion bracket including:

a first attachment portion connected to said base portion, said first attachment portion is of substantially loop shape in cross-section and includes wall portions having boss portions formed therein, said boss portions are thicker than the wall portions and include holes formed therethrough for attaching to said cushion units.

8. The motorcycle according to claim 7, wherein a wall portion of said first attachment portion furthest away from said base portion is the thinnest wall portion of said first attachment portion.

9. The motorcycle according to claim 7, wherein said motorcycle further comprises a seat and seat rails for supporting the seat, and said rear cushion bracket further includes a second attachment portion attached to said base portion for attaching the seat rails of the motorcycle thereto.

10. The motorcycle according to claim 9, wherein said first attachment portion is attached to said base portion at a position offset to one side of said base portion.

11. The motorcycle according to claim 6, wherein said motorcycle frame includes a main pipe, a pivot frame, lower pipes and a down pipe, and said rear cushion bracket is attached to an upper portion of the center pipe at a location adjacent to the main pipe.

\* \* \* \* \*